United States Patent
Appleton

[11] Patent Number: 5,941,309
[45] Date of Patent: Aug. 24, 1999

[54] ACTUATING BALL

[76] Inventor: Robert Patrick Appleton, Glenburn House, Tornaveen By Banchory, Aberdeen AB31 4NY, United Kingdom

[21] Appl. No.: 08/952,439
[22] PCT Filed: Mar. 24, 1997
[86] PCT No.: PCT/GB97/00819
  § 371 Date: Feb. 27, 1998
  § 102(e) Date: Feb. 27, 1998
[87] PCT Pub. No.: WO97/36088
  PCT Pub. Date: Oct. 20, 1997

[30] Foreign Application Priority Data

Mar. 22, 1996 [GB] United Kingdom ............... 9606118
Mar. 29, 1996 [GB] United Kingdom ............... 9606606

[51] Int. Cl.⁶ ............................. E21B 23/04; E21B 34/14
[52] U.S. Cl. ........................... 166/317; 166/192; 137/71
[58] Field of Search ............................ 166/317, 386, 166/126, 192; 137/71, 68.11

[56] References Cited

U.S. PATENT DOCUMENTS

| 4,509,716 | 4/1985 | Barber et al. . | |
| 4,557,331 | 12/1985 | Stout . | |
| 4,589,495 | 5/1986 | Langer et al. | 166/383 |
| 4,945,947 | 8/1990 | Westra et al. . | |
| 5,070,941 | 12/1991 | Kilgore . | |
| 5,180,016 | 1/1993 | Ross et al. . | |
| 5,411,049 | 5/1995 | Colvard | 137/71 |
| 5,413,180 | 5/1995 | Ross et al. . | |

FOREIGN PATENT DOCUMENTS 2 236 998 4/1991 United Kingdom .

*Primary Examiner*—Roger Schoeppel
*Attorney, Agent, or Firm*—Watson Cole Grindle Watson, P.L.L.C.

[57] ABSTRACT

The present invention relates to tools for use in wellbores which are actuated by means of actuating balls. The invention provides a method of actuating a tool located in a wellbore, the method comprising the sequential steps of: (a) locating a frangible actuating ball (2) on a seat, the seat being provided in the tool for receiving the actuating ball (2); (b) pumping fluid down a tubing string attached to the tool so as to apply a force to the seat and thereby actuate the tool, the force being transmitted to the seat through the actuating ball (2); and (c) breaking the actuating ball (2) to permit fluid to flow through the seat. The invention has the advantage over the prior art of providing means for actuating a downhole tool with an actuating ball (2) so that the actuating ball (2) does not form an undesirable obstruction once the tool has been actuated.

14 Claims, 2 Drawing Sheets

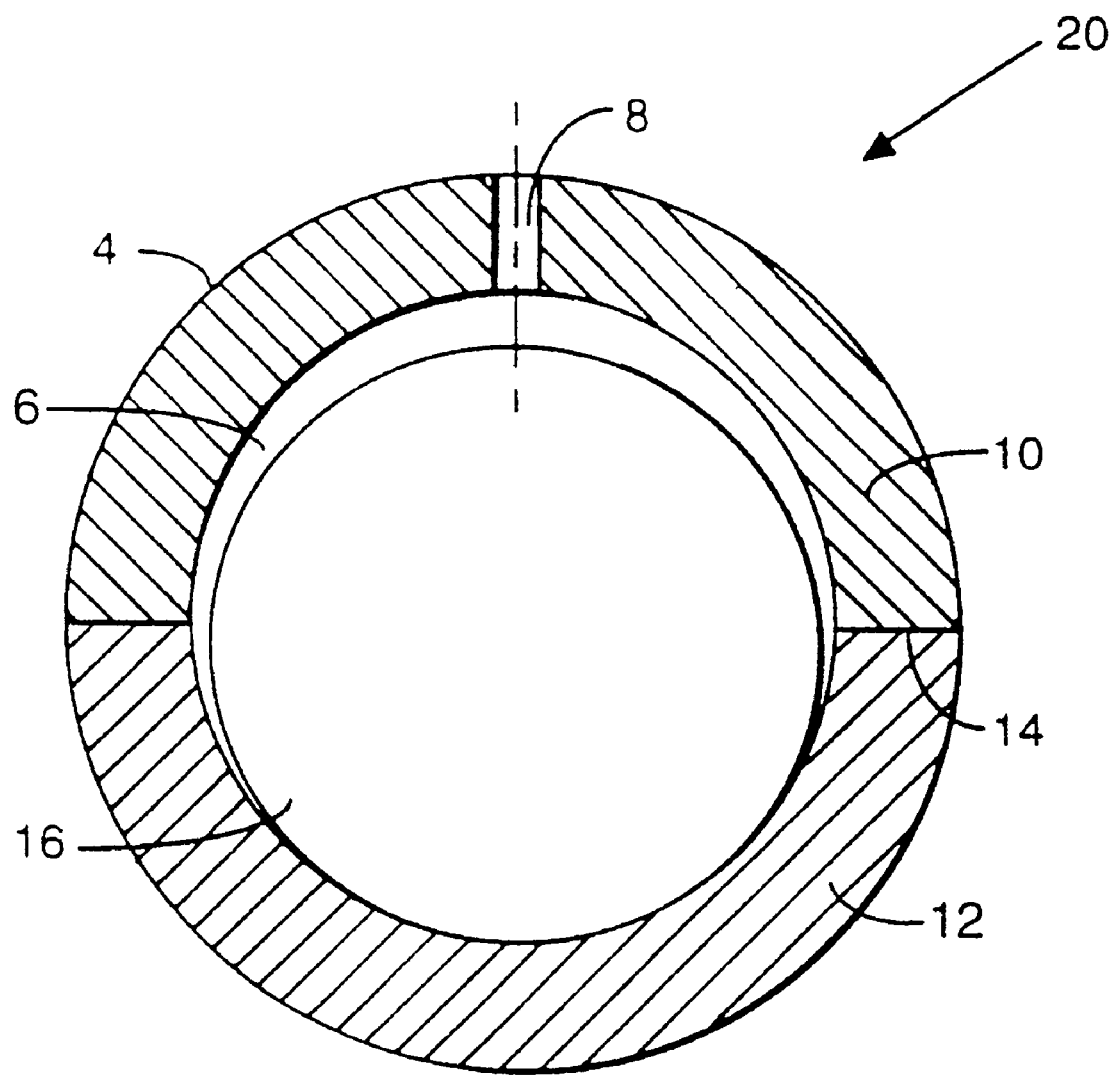

5,941,309

ACTUATING BALL

The present invention relates to tools for use in wellbores which are actuated by means of actuating balls.

It is well known that actuating balls are widely used in the oil and gas drilling industry to operate a variety of downhole tools. These tools may be used for drilling, testing, completing and remedial work. Conventional actuating balls are typically made from steel, bronze, plastic, bakelite or composite materials, and once received by a downhole tool, remain in the well configuration until removed by mechanical or manual means. Thus, once a conventional actuating ball is received by a tool, it remains an obstruction to fluid flowing down the tubing string until removed as described. In certain circumstances, the removal of a deployed actuating ball can be essential for the completion of a downhole operation, and the mechanical or manual methods presently employed for removal can be inconvenient and extremely expensive.

It is an object of the present invention to provide means for actuating a downhole tool with an actuating ball without the actuating ball becoming an obstruction to fluid flowing through the tool once the tool has been actuated.

A first aspect of the present invention provides a method of actuating a tool located in a wellbore, the method comprising the sequential steps of:

a) locating a frangible actuating ball on a seat, the seat being provided in the tool for receiving the actuating ball;

b) pumping fluid down a tubing string attached to the tool so as to apply a force to the seat and thereby actuate the tool, the force being transmitted to the seat through the actuating ball; and c) breaking the actuating ball to permit fluid to flow through the seat.

It is preferable for the frangible actuating ball to be located on the seat by introducing the actuating ball into a fluid flow travelling down the tubing string. It is further preferable for the step of breaking the actuating ball to include pumping fluid down the tubing string so as to increase the force transmitted by the actuating ball and thereby break the actuating ball.

Thus, the method of the present invention involves introducing an actuating ball into the tubing string and progressing the actuating ball down the string towards the tool to be actuated. The actuating ball may be progressed down the tubing string by the action of gravity or a fluid flowing within the string. Once the actuating ball is received by the seat, the flow of fluid down the tubing string is restricted or prevented, and therefore, a pressure differential across the actuating ball is generated. The pressure differential results in a force being applied to the seat of the tool which may be harnessed to actuate the tool. Once the tool has been actuated, the actuating ball remains located on the seat forming an obstruction. When the obstruction generated by the actuating ball is to be removed, the actuating ball is broken into a plurality of small fragments which are then removed by the flow of fluid down the tubing string. The actuating ball may be broken using one of a number of possible techniques, but it is preferably broken by pumping fluid down the tubing string so as to increase the pressure differential across the actuating ball until the structure of the ball fails.

A second aspect of the present invention provides a frangible actuating ball for use in the aforementioned method, the frangible actuating ball comprising a frangible wall provided with a pressure relief port adapted to equalise the pressure exerted on the sides of the wall. When the actuating ball is suspended in a downhole fluid flow, the pressure relief port allows fluid surrounding the actuating ball to flow into the ball and equalise the pressure exerted on the inner and outer surfaces of the frangible wall. Failure of the actuating ball structure on exposure to the hiqh hydrostatic pressures found at well depths is thereby prevented. However, the pressure relief port does not equalise the pressure differential generated when the actuating ball is received by the seat and does not therefore prevent the tile ball from failing when required.

Preferably, the frangible wall has a spherical shape and is preferably provided as two separate portions attached to one another by suitable attachment means. The two separate portions may have the same shape and may be attached by means of an adhesive. Alternatively, the two separate portions may be attached to one another by means of a weld.

It is desirable for the frangible wall to be provided with a weak portion having a thickness less than that of the remaining portions of the wall, the weak portion being thereby adapted to break when the actuating ball transmits a predetermined force. The frangible wall is preferably manufactured from borosilicate.

A secondary member is preferably enclosed by the frangible wall and it is desirable for the secondary member to have a spherical shape.

A third aspect of the present invention provides a tool for use in a wellbore and an actuating ball as defined above for actuating the tool, the tool having a function actuated by movement of a seat, the seat being adapted to receive the actuating ball and thereby restrict or prevent the flow of fluid through the tool.

The present invention has the advantage over the prior art of providing means for actuating a downhole tool with an actuating ball so that the actuating ball does not form an undesirable obstruction once the tool has been actuated. The present invention thereby provides a more convenient actuation of a downhole tool than that currently offered by the prior art.

An embodiment of the present invention will now be described with reference to the accompanying drawings, in which:

FIG. 3 is a cross-section view of a second embodiment of the second aspect of the present invention.

Figure 1:
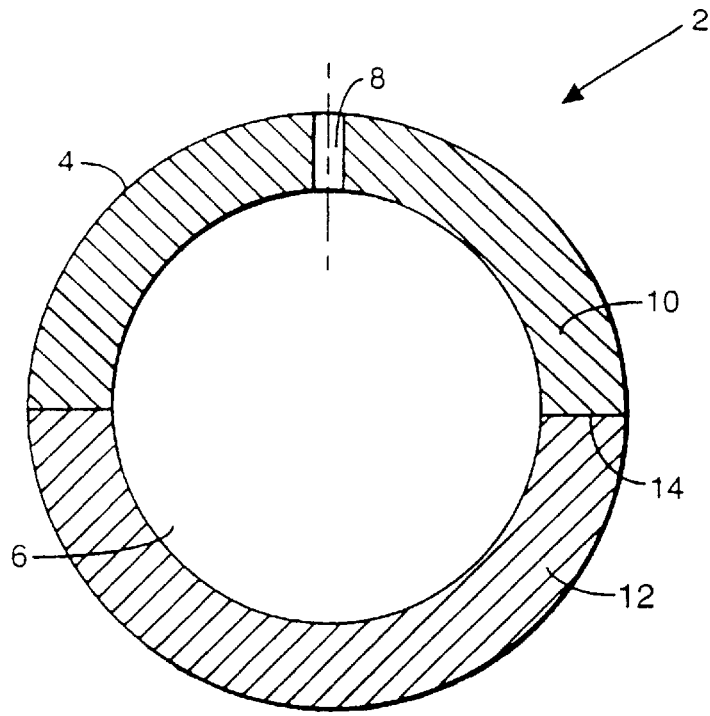
FIG. 1 is a cross-section view of a first embodiment of the second aspect of the present invention.
Figure 2:
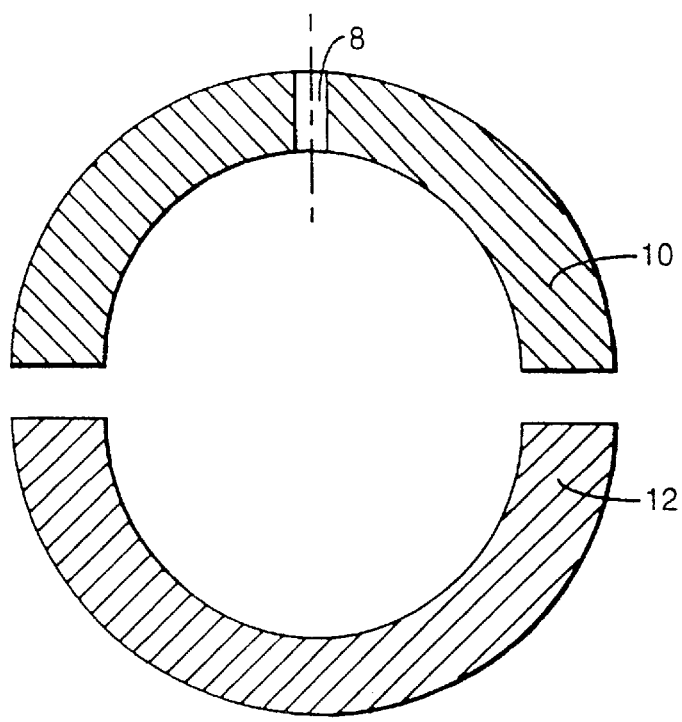
FIG. 2 is a cross-section view of the embodiment of FIG. 1 prior to assembly.

The actuating ball 2 shown in FIGS. 1 and 2 is a first embodiment according to the second aspect of the present invention. The actuating ball 2 comprises a frangible wall 4 having a spherical shape. The frangible wall 4 defines an enclosed space 6 which is in fluid communication with the exterior of the actuating ball 2 via a pressure relief port 8. The pressure relief port 8 thereby ensures that the hydrostatic pressure within the enclosed space 6 is equal to that surrounding the actuating ball.

The frangible wall 4 is manufactured from boro-silicate (Pyrex) to form a toughened glass. The frangible wall 4 is provided with a thickness sufficient to withstand a predetermined crushing force, which if exceeded, causes the structure of the actuating ball 2 to fall and disintegrate into a plurality of small fragments. The frangible wall 4 may be provided with a portion (not shown in FIGS. 1 to 3) having a thickness less than that of the remaining portions of the wall. This portion thereby provides a weakness in the structure of the actuating ball 2 along which the wall 4 will initially fracture. Such a portion provides convenient means for ensuring that the actuating ball 2 fails at a specific crushing force.

The actuating ball 2 is constructed from two hemispherical portions 10,12 which are attached to one another by means of an adhesive to form a join 14. Alternatively, the first and second hemispherical portions 10,12 may be attached to one another by conventional welding techniques. The two hemispherical portions 10,12 are identical to one another except for the pressure relief port 8 provided in the first portion 10.

The actuating ball 20 shown in FIG. 3 is a second embodiment according to the second aspect of the present invention. This second actuating ball 20 has a similar construction to the first actuating ball 2 shown in FIGS. 1 and 2. The same reference numerals as those used in FIGS. 1 and 2 are used in FIG. 3 for features of the second actuating ball 20 which are the same as the corresponding features of the first actuating ball 2.

The actuating ball 20 is arranged with a secondary member 16 provided in the enclosed space 6. The secondary member 16 is a solid spherical ball manufactured from glass or steel and has the function of providing the actuating ball 20 with additional weight.

The actuating balls 2,20 shown in FIGS. 1, 2 and 3 are used in association with a downhole tool. The downhole tool is provided with a seat for receiving the actuating ball. The seat will typically have an annular shape through which fluid flowing down a tubing string may pass. Furthermore, the seat is generally moveable in an axial direction and biased towards an uphole position by means of a compression spring. Downhole movement of the seat against the biasing force of the compression spring results in the actuation of the tool. Downhole tools of this type are commonplace in the oil and gas drilling industry, and consequently, need not be described any further.

When in use, an actuating ball of the present invention is introduced into a tubing string and progressed downhole towards the tool to be actuated until received by the seat of the tool. The actuating ball may be progressed down the tubing string by the action of gravity or a flow of fluid within the string. When the actuating ball is received by the seat, any flow of fluid through the seat is either restricted or prevented and thereby generates a pressure differential across the actuating ball. As a result, a force is applied to the seat of the tool which may overcome the biasing force of the compression spring so as to move the seat and actuate the tool.

Once the tool has been actuated, the obstruction within the tubing string caused by the actuating ball may be conveniently removed by breaking the actuating ball into a plurality of small fragments. This may be achieved by increasing the pressure differential across the actuating ball so that the predetermined crushing force is exceeded.

Once the actuating ball has disintegrated, the plurality of small fragments are displaced by the flow of fluid down the tubing string and the obstruction caused by the actuating ball is thereby removed. If a secondary member is present, then this is also displaced down the tubing string by the fluid flow.

The present invention is not limited to the specific embodiments desrcibed above. Alternative arrangement and materials will be apparent to a reader skilled in the art.

We claim:

1. A method of actuating a tool located in a wellbore, the method comprising the sequential steps of:
    a) locating a frangible actuating ball on a seat, the seat being provided in the tool for receiving the actuating ball;
    b) pumping fluid down a tubing string attached to the tool so as to apply a force to the seat and thereby actuate the tool, the force being transmitted to the seat through the actuating ball; and
    c) breaking the actuating ball to permit fluid to flow through the seat.

2. A method of actuating a tool as claimed in claim 1, wherein the frangible actuating ball is located on the seat by introducing the actuating ball into a fluid flow travelling down the tubing string.

3. A method of actuating a tool as claimed in claim 1, wherein the step of breaking the actuating ball includes pumping fluid down the tubing string so as to increase the force transmitted by the actuating ball and thereby break the actuating ball.

4. A frangible actuating ball for use in the method claimed in claim 1, the frangible actuating ball comprising a frangible wall provided with a pressure relief port adapted to equalise the pressure exerted on the sides of the wall.

5. A frangible actuating ball as claimed in claim 4, wherein the frangible wall has a spherical shape.

6. A frangible actuating ball as claimed in claim 4, wherein the frangible wall is provided as two separate portions attached to one another by suitable attachment means.

7. A frangible actuating ball as claimed in claim 6, wherein the two separate portions have the same shape.

8. A frangible actuating ball as claimed in claim 6, wherein the attachment means is an adhesive.

9. A frangible actuating ball as claimed in claim 6, wherein the attachment means is a weld.

10. A frangible actuating ball as claimed in claim 4, wherein the frangible wall is provided with a weak portion having a thickness less than that of the remaining portions of the wall, the weak portion being thereby adapted to break when the actuating ball transmits a predetermined force.

11. A frangible actuating ball as claimed in claim 4, wherein the frangible wall is manufactured from borosilicate.

12. A frangible actuating ball as claimed in claim 4, wherein a secondary member is enclosed by the frangible wall.

13. A frangible actuating ball as claimed in claim 12, wherein the secondary member has a spherical shape.

14. A tool for use in a wellbore and an actuating ball claimed in claim 4, for actuating the tool, the tool having a function actuated by movement of a seat, the seat being adapted to receive the actuating ball and thereby restrict or prevent the flow of fluid through the tool.

* * * * *